(12) United States Patent
Newberg et al.

(10) Patent No.: US 7,369,852 B2
(45) Date of Patent: May 6, 2008

(54) METHODS FOR INFORMING SUBSCRIBERS IN A CHANNELIZED NETWORK OF ADJACENT SITES

(75) Inventors: Donald G. Newberg, Hoffman Estates, IL (US); Robert A. Biggs, Evanston, IL (US); Daniel J. McDonald, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 31 days.

(21) Appl. No.: 11/115,438

(22) Filed: Apr. 27, 2005

(65) Prior Publication Data

US 2006/0246896 A1 Nov. 2, 2006

(51) Int. Cl.
*H04Q 7/20* (2006.01)

(52) U.S. Cl. .................. 455/435.1; 455/435.2; 455/435.3; 455/436; 455/439; 455/446; 370/329; 370/328; 370/338; 370/330; 370/331

(58) Field of Classification Search ........ 455/436–445, 455/422.1, 435.1, 435.2, 435.3, 446, 450, 455/451; 370/329, 328, 330, 331
See application file for complete search history.

(56) References Cited

U.S. PATENT DOCUMENTS

| | | | | |
|---|---|---|---|---|
| 5,577,168 | A * | 11/1996 | Haas et al. | 455/443 |
| 6,188,904 | B1 * | 2/2001 | Marsan | 455/450 |
| 7,058,405 | B2 * | 6/2006 | Chandra et al. | 455/436 |
| 2002/0071404 | A1 * | 6/2002 | Park et al. | 370/331 |
| 2004/0058679 | A1 * | 3/2004 | Dillinger et al. | 455/439 |
| 2005/0026617 | A1 * | 2/2005 | Okuyama | 455/436 |

* cited by examiner

*Primary Examiner*—Rafael Perez-Gutierrez
*Assistant Examiner*—Khai Nguyen
(74) *Attorney, Agent, or Firm*—Indira Saladi; Valerie M. Davis

(57) ABSTRACT

A method for informing a mobile device of adjacent sites in a RF communication system is disclosed. The RF communication system comprises a first network and a second network. At a site in the second network of the RF communication system, information is maintained of adjacent sites wherein the adjacent sites are within the first network, and a first list of adjacent sites is broadcast to at least one mobile device within coverage of the site in the second network.

18 Claims, 2 Drawing Sheets

METHODS FOR INFORMING SUBSCRIBERS IN A CHANNELIZED NETWORK OF ADJACENT SITES

RELATED APPLICATION(S)

This application is related to a co-pending application entitled "METHODS FOR PROVIDING SUBSCRIBERS OF ADJACENT SITES," filed on Mar. 29, 2005 with application Ser. No. 11/092,089, and assigned to the assignee of the instant application.

FIELD OF THE INVENTION

The present invention relates generally to wireless communication systems and in particular to the field of adjacent site updates in wireless communication systems.

BACKGROUND

A wireless communication system generally comprises a number of "mobile devices," where the mobile devices are typically the endpoints of a communication link, and communications infrastructure comprising sites, where the communications infrastructure is typically stationary and the intermediaries by which a communication link to a mobile device may be established or maintained. As a mobile device moves in a geographic area, the mobile device may handoff from one site to another site in the communications infrastructure, so that the communication link is maintained. It is generally desirable to allow for the rapid establishment of communication links between a mobile device and the communications infrastructure without errors and without inadvertently dropping or losing a communication link.

Where the communications infrastructure comprises of one type of network, e.g. a traditional channelized network, such as a radio network, the ability to establish communication links between the mobile device and the communications infrastructure is generally accommodated by informing the mobile device of adjacent sites so that when the mobile device has the need to hand off from one site to another, the mobile device has knowledge of adjacent sites. Such a solution is not available where the communications infrastructure comprises of two different types of networks, e.g. a channelized network and a packet data network.

If a mobile device requires the need to switch from a site (also generally referred to as a "base station" or a "transmitter") of a first network to a site of a second network, the mobile device has no knowledge of the sites in the second system. For example, when the mobile device moves between areas serviced by a first network that is a channelized network and areas serviced by a second network that is a packet data network, the mobile device needs to be able to hand off from the first network to the second network without affecting the communication taking place by the mobile device. For example, when a police officer moves from his squad car served by a first network to go inside police headquarters building served by a second network, the police officer should be able to continue his/her conversation using the same communication unit and without having his or her communication delayed or dropped.

Accordingly, there is a need for informing a mobile device in a first network of adjacent sites in a second network.

BRIEF DESCRIPTION OF THE FIGURES

The present invention is illustrated by way of example and not limitation in the accompanying figures, in which like references indicate similar elements, and in which.

Figure 1:
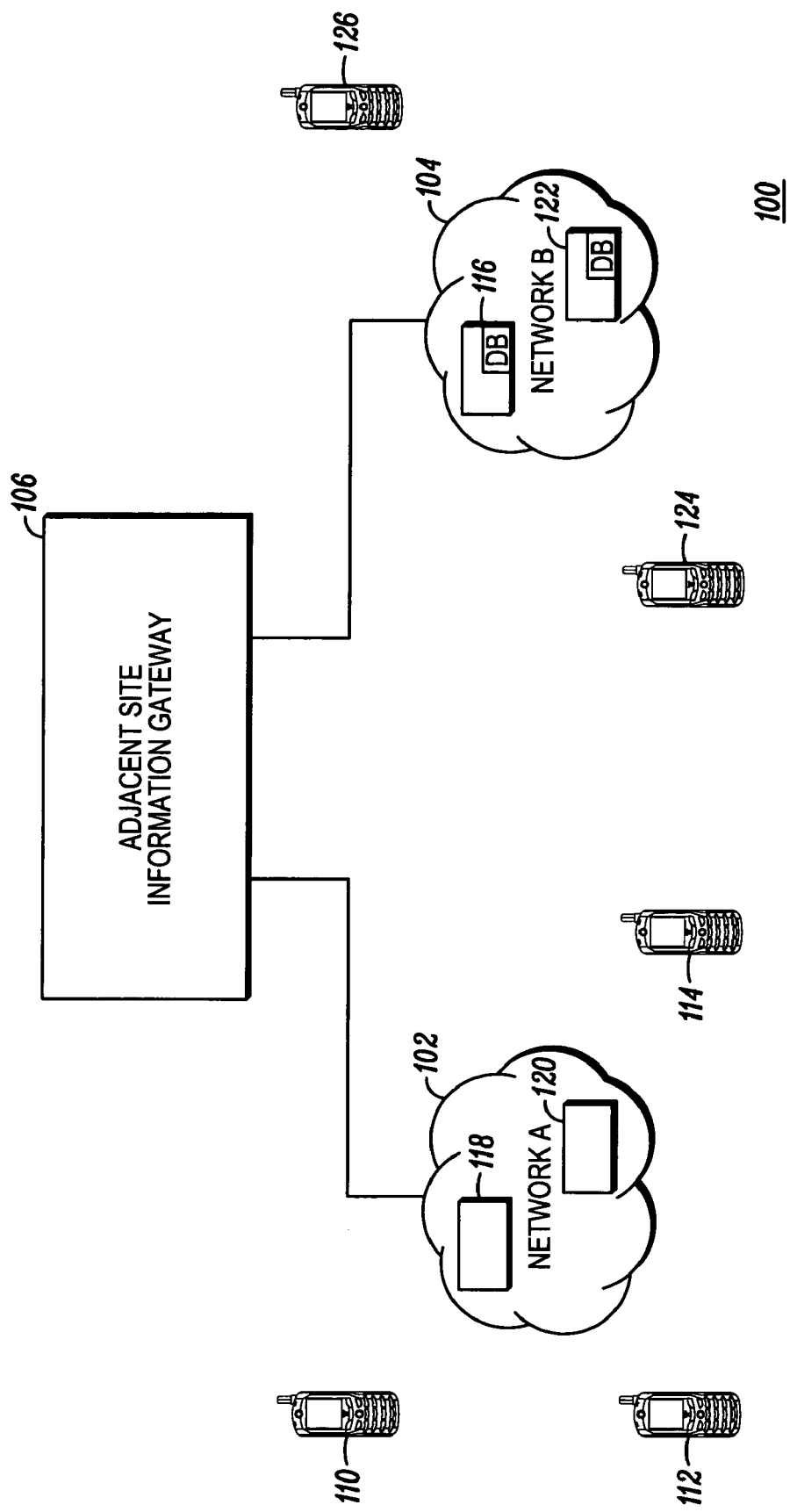
FIG. 1 is an example of a simple block diagram illustrating an RF communication system in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail adjacent site updates in accordance with an embodiment of the present invention, it should be observed that the present invention resides primarily in combinations of method steps and apparatus components related to adjacent site updates. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIG. 1, a radio frequency (RF) communication system 100 according to an embodiment of the present invention illustratively comprises an adjacent site information gateway 106 which interfaces between a first network, namely Network A, 102 and a second network, namely Network B, 104, and mobile devices 110, 112, 114, 124, 126. Network A 102 comprises sites 118, 120 and Network B 104 comprises sites 116, 122. In FIG. 1, each network is illustrated with only two sites for the purpose of ease of illustration. However, it should be understood by those of ordinary skill in the art that both networks may be designed with any number of sites. Further, in FIG. 1, only two networks are shown for ease of illustration. However, it should be understood by those of ordinary skill in the art that more than two networks may co-exist where the adjacent site information gateway interfaces between the more than two networks.

As used herein, the term "site" is generally composed of at least one co-located transceiver having a substantially similar coverage area or antenna pattern. As is known in the art, the transceiver is generally referred to as a "base station," "base radio," "repeater," or "access point." Further, the term "site" generally has specific meaning depending on the type of network that the "site" is associated with, but in any case the "site" provides RF coverage over a specific geographic area. For example, referring to FIG. 1, sites 116, 122 of Network B 104 are generally fixed in location and comprise a control and voice channel that adheres to a TIA 102 (also known as APCO 25) standard and sites 118, 120 of Network A may be fixed or mobile and may adhere to IEEE 802 standards. In an exemplary embodiment of the present invention, sites 116, 122 of Network B 104 further comprise a database of adjacent site information.

In an exemplary embodiment of the present invention, the adjacent site information gateway 106 is an interface which provides signaling for the two networks. That is, the adjacent site information gateway 106 receives messages from one network and provides information to a second network. As mentioned above, the information contained in the messages is kept in a database of site 116 where the database includes information about sites in the two networks and has information such as site IDs, capacity, and site location. Further yet, a typical adjacent site information gateway 106 includes a main processing unit such as a computer with appropriate control software that controls the operation of the gateway 106.

Network A 102 and Network B 104 are separate networks where the two networks differ in at least one characteristic. The two networks may differ in ownership. For example, Network A 102 may be owned by one governmental entity, and Network B 104 may be owned by another governmental entity. The two systems may differ in whether they are managed or not, where management refers to the level of central control of the network. For example, Network A 102 may be an unmanaged network, such as a wireless local area network (WLAN) and Network B 104 may be a managed network, such as a Trans European Trunked Radio (TETRA) network. The two systems may differ in protocol. For example, Network A 102 may be an Association of Public Safety Communication Officers Project 25 (APCO 25) radio network and Network B 104 may be an Internet Protocol (IP) network. The two systems may differ in the type of switching. For example, Network A 102 may be a packet data network having no switching and Network B 104 may be a circuit switched network. The two systems may differ in channelization. For example, Network A 102 may be a single channel network and Network B 104 may be a channelized network. The two systems may differ in capacity. For example, Network A 102 may support high bitrate traffic and Network B 104 may support only low bitrate traffic. The two systems may differ in Quality of Service guarantees. For example, Network A 102 may support only best effort QoS and Network B 104 may support a guaranteed QoS. The two systems may differ in the ability to support communication with a mobile device that is in motion. For example, Network A 102 may communicate with stationary mobile devices and Network B 104 may communicate with mobile devices traveling at high speeds. In any case, the characteristic that differentiates the two networks is at least one of ownership, management, protocol, switching, channelization, capacity, Quality of Service guarantees, and ability to support communication with a mobile device that is in motion.

The endpoints of communication in the RF communication system 100 are the mobile devices 110, 112, 114, 124, 126. The mobile devices 110, 112, 114, 124, 126 are generally communication devices that may be either sources or recipients of payload and/or control messages routed through the RF communication system 100. As such, the mobile devices 110, 112, 114, 124, 126 may be any suitable type of wireless communications device capable of communicating within the RF communication system 100, for instance, a laptop computer, a personal digital assistant, a voice handset, or any other suitable device as will be appreciated by those of skill in the art. In an exemplary embodiment, the mobile devices 110, 112, 114, 124, 126 are P25 radios equipped with a WLAN modem. The mobile devices may also be connected to a fixed communications infrastructure, if desired.

In operation, the mobile device, e.g. mobile device 124, may roam from a first coverage area serviced by Network B 102 to a second coverage area serviced by Network A 102 while receiving a communication. The communication may be voice, video, or a multi-media communication encompassing both voice and video and may be received from another mobile device or from another communications device either within the RF communication system 100 or without. Thus, the mobile device 124 may be connected to Network B 104 and move into an area serviced by Network A 102. As is known in the art, the two areas may physically overlap and the two networks may serve the same physical area. In an embodiment of the present invention, the mobile devices 124, 126 are informed of the sites, e.g. sites 118, 120, in Network A 102 so that a mobile device in Network B 104 can switch without disruption to Network A 102.

While an embodiment of the present invention has been described in broad terms regardless of the types of networks, an embodiment of the present invention is contemplated to work with many types of networks. For example, both Network A 102 and Network B 104 may be APCO 25 voice radio systems owned by different entities. For example, Network A 102 may be owned by a local police department and Network B 104 may be owned by the federal government. Another example, Network A 102 may be an APCO 25 voice network and Network B 104 may be an APCO 25 data network. Another example, Network A 102 may be an IP system and Network B 104 may be an APCO 25 voice or data network. In yet another example, Network A 102 may be a public cellular network and Network B 104 may be an APCO 25 voice or data network. Regardless of the type of network, as mentioned above, the two networks differ in at least one characteristic.

Further, examples of either Network A 102 or Network B 104 encompass radio frequency (RF) technologies, such as Code Division Multiple Access (CDMA), Time Division Multiple Access (TDMA), Frequency Division Multiple Access (FDMA), Orthogonal Frequency Division Mutiplexing (OFDM), and the like, implemented in any currently available radio network, such as, for example, Global System for Mobile communication (GSM), General Packet Radio Service (GPRS), Universal Mobile Telecommunications Service (UMTS), Trans-European Trunked Radio service (TETRA), APCO Project 25 (as mentioned above), Personal Communication Service (PCS), Advanced Mobile Phone Service (AMPS) and the like. In such examples, the sites 116, 118, 120, 122 may be termed base radios, base stations and/or transmitters. In the alternative, Network A or Network B may encompass other wireless technologies, such as those now known or later to be developed and including, but not limited to, infrared, Bluetooth, electric field, electromagnetic, and electrostatic transmissions. Further yet, examples of either Network A 102 or Network B 104 may support IP networks, where the IP network may be an 802.11 wireless local area network (WLAN), wherein the mobile devices 110, 112, 114, and the sites 118, 120 are configured to operate in accordance with the ANSI/IEEE (American National Standards Institute/Institute of Electrical and Electronics Engineers) 802.11 wireless LAN standards. Alternatively, packet data network, e.g. Network A 102, may adhere to another ANSI/IEEE 802 wireless standard, such as 802.15.1, 802.15.3, 802.15.4, 802.16, 802.20, 802.22, and the like. The mention of ANSI/IEEE 802.11 is not to be construed as a limitation. In such an example, the sites 116, 118, 120, 122 may be termed access points (APs) and/or transmitters.

Practitioners skilled in the art will appreciate that the RF communication system 100 may include various other communication devices not specifically shown in FIG. 1. For example, either Network A 102 or Network B 104 may comprise a link, such as, for example a T1 line or E1 digital carrier system that connects a site, e.g. site 116 to a public switched telephone network (PSTN) via a telephone gateway, a paging network or short message system via a paging gateway, and a facsimile machine or similar device via fax gateway or modem. In addition, either network 102, 104 may be connected via a site, e.g. site 118, to an underlying network that may be implemented, for instance, as a wired network or as a mesh network having fixed or mobile sites.

In any case, the communication between the sites 116, 118, 120, 122 and the mobile devices 110, 112, 114, 124, 126 may comprise multiple RF channels such as pairs of frequency carriers, TDMA time slots, CDMA channels, and the like or may comprise a single RF channel with a single OFDM channel, and the like. Thus, the communications between the sites and the mobile devices takes place on the channel(s).

Figure 2:
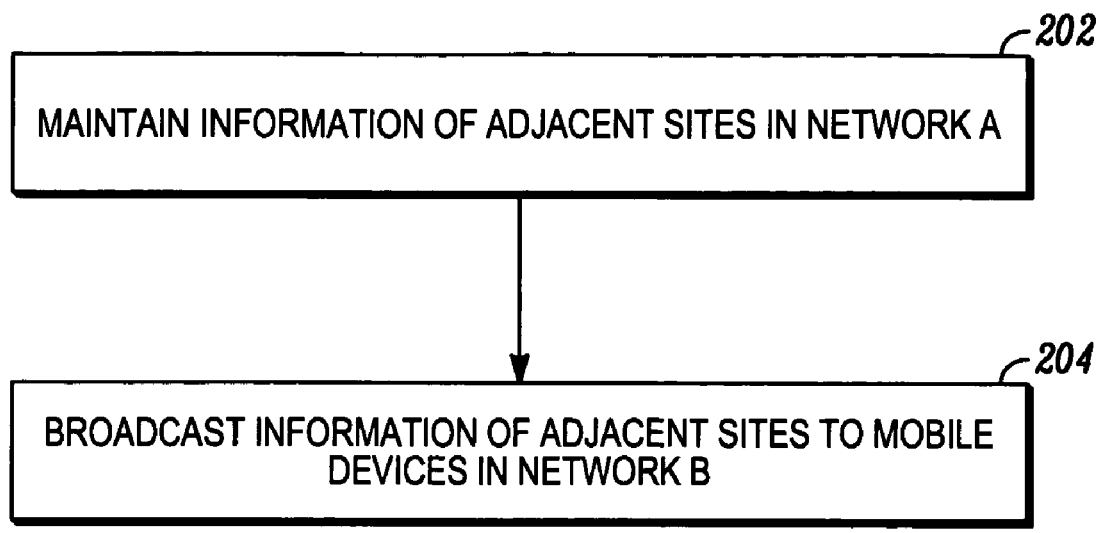
FIG. 2 is a flow chart illustrating a method for a site in a first network to be informed of sites in a second network in accordance with some embodiments of the invention.

Referring to FIG. 2, shown is a flow chart for the process performed by a site, e.g. site 116, that is in Network B 104 to be informed of sites that are in Network A 102. In an exemplary embodiment, each site in Network B 104 maintains information of adjacent sites in Network A 102 (Block 202). In a further embodiment, adjacent sites are those that are geographically close to the site. In one embodiment, each site in Network B 104 maintains information of adjacent sites in Network A by preprogramming and/or preconfiguration of the site in Network B 104. For example, site 120 is geographically close to site 116, so site 116 may be preconfigured with site 120's information. In an alternate embodiment, each site in Network B 104 may receive information of adjacent sites in Network A 102 from an adjacent site gateway 106.

In any case, information relating to the adjacent sites in Network A 102 that each site in Network B 104 may maintain includes the site in Network A's 102 identification, location, and attributes where attributes is at least one of an access technology, bandwidth availability, and quality of service. In an exemplary embodiment, Network B is a channelized network and site 116 is a base station of the channelized network. Further, in such an example, Network A 102 is a packet data network and site 120 is an access point (AP) of the packet data network. In such an embodiment, site 116 maintains site 120's site name and/or site identifier, e.g. as is known to one or ordinary skill in the art, an SSID, geographic location, access technology, bandwidth availability, and Quality of Service (QoS) capability.

Knowing the adjacent site information, the site in Network B 104 broadcasts information about the sites in Network A 102 to mobile devices within coverage of the site in Network B 104 (Block 204). In one embodiment, the site in Network B 104 sends the adjacent site information in a signaling message to the mobile device within coverage of the site in Network B 104. In an exemplary embodiment, the signaling message is a proprietary message that is sent on a control channel where the signaling message adheres to an APCO 25 standard.

As the mobile device moves in Network B 104, the mobile device may receive further signaling messages with adjacent site information that are unique to the site. For example, site 122 may broadcast different adjacent site information, such as information relating to a Network C (not shown) where a site in Network C is geographically close to site 122.

In one embodiment, the sites in Network A 102 are mobile. Because the sites in Network A 102 can change position, it is advantageous to provide adjacent site information to mobile devices in Network B 104, e.g. mobile device 124. In such a case, an adjacent site information gateway 106 can be used to inform the mobile device 124 of the sites of Network A 102 that are physically near the mobile device in Network B 104. Thus, when the mobile device in Network B 104 hands off from Network B 104 to a site in Network A 102, it will have information of the adjacent sites in Network A 102 that are near to the mobile device.

The mobile site, e.g. site 120, in Network A 102 updates the adjacent site information gateway 106 with its position. In one embodiment, updating the adjacent site information gateway 106 with position information occurs periodically based upon an elapsed time. In another embodiment, updating the adjacent site information gateway 106 with position information occurs whenever the mobile site, e.g. site 120, has moved a fixed distance. For example, the site 120 may update the adjacent site information gateway 106 with its position every 5 miles. In yet another embodiment, updating the adjacent site information gateway 106 with position information occurs when the adjacent site information gateway 106 requests such an update. For example, the adjacent site information gateway 106 may send a signaling message, such as a broadcast message, requesting that all the mobile sites within the network provide the adjacent site information gateway 106 with position information.

Upon receiving the position information of the mobile site, the adjacent site information gateway 106 determines a list of sites (whether mobile or not) in Network A 102 that are near the site in Network B 104 and sends the list to the site in Network B 104 (Block 202). In one embodiment, mobile device in Network B 104 may receive updates to the list of sites that are near the mobile device whenever the site in Network A 102 updates the adjacent site information gateway with the site's position.

In one embodiment, the adjacent site information gateway 106 functions as an interface between Network A 102 and Network B 104 and maintains information of the sites in Network A 102 to transfer the information to the sites in Network B 104. Such information includes site parameters where site parameters comprise information relating to RF channels supported by the site, system identification, geographical location of the site, the number of mobile devices supported by the site, the number of mobile devices capable of being supported by the site, the number of communications supported by the site, the bitrate capacity supported by the site, the current bandwidth utilization of the site, the Quality of Service (QoS) guarantees supported by the site, the ability of the site to support communication with a mobile device that is in motion, and the relative preference for this site to be part of a handoff. For example, the adjacent site information gateway 106 may have information of the location of site 118, the capacity as measured by the number of mobile devices supported by the site 118, the RF frequencies of the control and voice channels, etc.

From the information of the sites in Network A 102 and in Network B 104, the adjacent site information gateway 106 determines a list of sites that are near the site in Network B 104 that are impacted by the movement of sites in Network A 102. In one embodiment, the adjacent site information gateway determines a list of sites in Network A 102 that are near the sites in Network B 104 by calculating a distance between the sites in Network B 104 and each site in Network A 102 where a site is near if the distance is the smallest calculated number. In another embodiment, a site is near if it is closer than a threshold distance.

In any case, the adjacent site information gateway 106 sends a list of sites in Network A 102 to the sites in Network B 104. In one embodiment, the list is sent directly to each site in Network B 104 and in a signaling message to the mobile devices associated with each site. In another embodiment, an updated list is sent to each mobile device whenever the site in Network B 104 receives an updated list from the adjacent site information gateway 106. For example, if the adjacent site information gateway has received new position information from a site in Network A 102, the adjacent site information gateway will send an updated list of sites to each site in Network B 104 where each site sends an updated list to each mobile device associated with the site.

Having received the list of adjacent sites in Network A 102 from the site, the mobile device, e.g. mobile device 124, in Network B 104 can handoff to a site in Network A 102. The mobile device may choose one site from the list of adjacent sites and determine a site in Network A 102 to handoff to. In one embodiment, as the mobile device moves, the mobile device may request a list of adjacent sites in the first network from a site in Network B 104 that the mobile device is affiliated with. In response to the request, the site in Network B 104 sends a list of adjacent sites in Network A 102 to the mobile device in Network B 104. In such an embodiment, the request from the mobile device may be sent when the mobile device has moved a significant distance where significant distance means a distance greater than a threshold value.

It will be appreciated the adjacent site updates described herein may be comprised of one or more conventional processors and unique stored program instructions that control the one or more processors to implement, in conjunction with certain non-processor circuits, some, most, or all of the functions of the adjacent site updates described herein. The non-processor circuits may include, but are not limited to, a radio receiver, a radio transmitter, signal drivers, clock circuits, power source circuits, and user input devices. As such, these functions may be interpreted as steps of a method to perform adjacent site updates. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for informing a mobile device of adjacent sites in a RF communication system wherein the RF communication system comprises a first network and a second network comprising the steps of:
   at a site in the second network of the RF communication system:
      maintaining information of adjacent sites wherein the adjacent sites are within the first network; and
      broadcasting a first list of adjacent sites to at least one mobile device within coverage of the site in the second network, wherein the first list of adjacent sites is created from the maintained information;
   at a site in the first network of the RF communication system:
      updating an adjacent site information gateway with information of a site in the first network; and
   at the adjacent site information gateway:
      determining a second list of adjacent sites in the first network that are near the site in the second network; and
      sending the second list to the site in the second network.

2. The method of claim 1 wherein the adjacent sites are at least one of mobile sites and stationary sites.

3. The method of claim 1 wherein the site further comprises a database for storing information of adjacent sites in the first network.

4. The method of claim 1 wherein the site provides RF coverage over a specific geographic area and is at least one of base station, base radio, repeater, and access point.

5. The method of claim 1 wherein the site is preprogrammed with information of adjacent sites that are geographically close to the site.

6. The method of claim 1 wherein the site in the first network is a mobile site.

7. The method of claim 6 wherein the step of updating occurs at a time wherein the time is at least one of a) an elapsed time, b) when the mobile site has moved a fixed distance, and c) when the adjacent site information gateway requests an update.

8. The method of claim 7 further comprising the step of informing a mobile device in the second network with the second list of adjacent sites when the site in the second network receives the second list.

9. The method of claim 1 wherein the step of determining further comprises calculating a distance between the site in the second network and each site sit in the first network to find a distance that is smaller than a threshold.

10. The method of claim 1 wherein the step of broadcasting further comprises sending a proprietary message that adheres to a TIA 102 standard.

11. The method of claim 1 further comprising:
at a mobile device in the second network of the RF communication system:
   receiving the first list of adjacent sites associated with the site in the second network;
   determining a site in the first network to handoff wherein the site is chosen from the first list of adjacent sites; and
   handing off to the site in the first network from the site in the second network.

12. The method of claim 11 wherein the step of determining further comprises calculating a distance between the mobile device and each site in the first list of adjacent sites to find a distance that is the smaller than a threshold.

13. The method of claim 1 further comprising:
at a mobile device in the second network of the RF communication system:
   requesting a second list of adjacent sites in the first network when the mobile device has moved a significant distance from when the mobile device received the first list of adjacent sites, wherein the significant distance is a distance greater than a threshold value; and
   receiving the second list of adjacent sites in the first network from the site.

14. The method of claim 1 wherein the information is maintained in a database of the site.

15. The method of claim 1 wherein the first network and second network differ in at least one characteristic wherein the characteristic is taken from the group ownership, management, protocol, switching, channelization, capacity, Quality of Service guarantees, and ability to support communication with a mobile device that is in motion.

16. The method of claim 1 wherein the second network is a radio network chosen from the list comprising Global System for Mobile communication (GSM), General Packet Radio Service (GPRS), Universal Mobile Telecommunications Service (UMTS), Trans-European Trunked Radio service (TETRA), Association of Public Safety Communication Officers (APCO) Project 25, Personal Communication Service (PCS), and Advanced Mobile Phone Service (AMPS).

17. The method of claim 1 wherein the information comprises at least one of site name, site identifier, geographic location, access technology, bandwidth availability, and Quality of Service capability.

18. A system for informing a mobile device of adjacent sites in a RF communication system wherein the RF communication system comprises a first network and a second network comprising the steps of:
   means for maintaining information of adjacent sites at a site in the second network of the RF communication system, wherein the adjacent sites are within the first network;
   means for broadcasting a first list of adjacent sites to at least one mobile device within coverage of the site in the second network, wherein the first list of adjacent sites is created from the maintained information;
   means for updating an adjacent site information gateway with information of a site in the first network;
   means for determining a second list of adjacent sites in the first network that are near the site in the second network;
   means for sending the second list to the site in the second network.

* * * * *

UNITED STATES PATENT AND TRADEMARK OFFICE
CERTIFICATE OF CORRECTION

| | | |
|---|---|---|
| PATENT NO. | : 7,369,852 B2 | Page 1 of 1 |
| APPLICATION NO. | : 11/115438 | |
| DATED | : May 6, 2008 | |
| INVENTOR(S) | : Newberg et al. | |

It is certified that error appears in the above-identified patent and that said Letters Patent is hereby corrected as shown below:

IN THE CLAIMS

In Column 8, Line 66, in Claim 9, after "each site" delete "sit".

In Column 9, Line 16, in Claim 12, after "that is" delete "the".

Signed and Sealed this
Thirteenth Day of September, 2011

David J. Kappos
*Director of the United States Patent and Trademark Office*